April 21, 1970 W. E. SIVERTSON, JR 3,508,152

ADAPTIVE COMPRESSION OF COMMUNICATION SIGNALS

Filed Oct. 31, 1966 5 Sheets-Sheet 1

INVENTOR
WILFORD E. SIVERTSON, JR.

BY

ATTORNEYS

April 21, 1970 W. E. SIVERTSON, JR 3,508,152

ADAPTIVE COMPRESSION OF COMMUNICATION SIGNALS

Filed Oct. 31, 1966 5 Sheets-Sheet 2

INVENTOR
WILFORD E. SIVERTSON, JR.

BY *T. H. McCoy*
*William H. King*
ATTORNEYS

April 21, 1970 W. E. SIVERTSON, JR 3,508,152

ADAPTIVE COMPRESSION OF COMMUNICATION SIGNALS

Filed Oct. 31, 1966 5 Sheets-Sheet 3

INVENTOR
WILFORD E. SIVERTSON, JR.

BY
G. T. McCoy
William H. King
ATTORNEYS

INVENTOR
WILFORD E. SIVERTSON, JR.

BY
[signature] [signature]
ATTORNEYS

ADAPTIVE COMPRESSION OF COMMUNICATION SIGNALS

INVENTOR
WILFORD E. SIVERTSON, JR.

BY

G. T. McCoy
William H. King
ATTORNEYS 3,508,152

ADAPTIVE COMPRESSION OF COMMUNICATION SIGNALS

Wilford E. Sivertson, Jr., Rte. 3, Box 164, Yorktown, Va. 23490

Filed Oct. 31, 1966, Ser. No. 591,004
Int. Cl. H04b *1/66;* H04n *7/00*
U.S. Cl. 325—42 9 Claims

ABSTRACT OF THE DISCLOSURE

The invention consists of an improvement in a pulse code modulated communication system of the type in which pseudo-random noise is added to the transmitted signal prior to transmission to achieve bandwidth compression. In prior systems compression was limited to positive integers and to one fixed value of compression, set prior to use, and thereafter unalterable. The present invention obtains positive mixed number compression ratios as well as positive integer compression ratios. The invention utilizes an adaptive variable resolution technique in which the compression ratios are automatically changed as the quality of the transmitted signal changes and in which a level of pseudo-random noise corresponding to each compression ratio is added to the transmitted signal prior to encoding.

Figure 1:
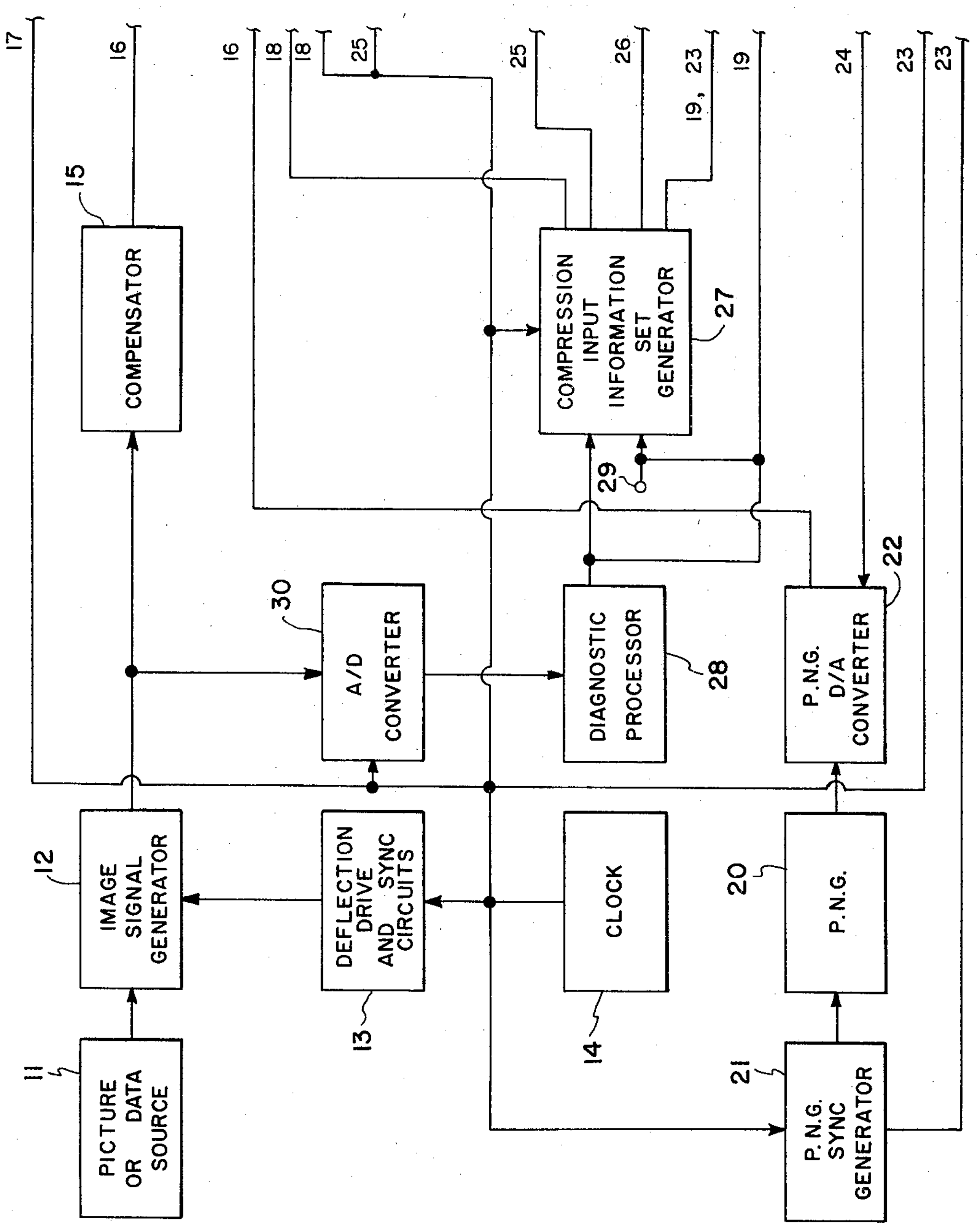

The invention described herein was made by an employee of the United States Government and may be manufactured or used by or for the Government for governmental purposes without the payment of any royalties thereon or therefor.

The invention relates generally to communication systems and more specifically concerns an improvement in the efficiency of communications systems by employing an adaptive variable resolution encoding technique.

This invention presents a technique designed to modify and improve the operational capabilities of a known method for reducing the channel capacity required for transmitting a television signal. A method known to be effective in reducing the bandwidth required to transmit pulse code modulated television employs the addition of pseudo-random noise to a television signal. This noise is added prior to encoding and transmission, and is removed from the composite signal after reception. The invention modifies the pseudo-random noise method by employing a variable resolution, or word length, encoder with means for adapting, in real time, the level of added pseudo-random noise. The encoder resolution is made variable by manually or automatically selecting the conversion of a full scale analog input signal into a one bit through an *n* bit digital word equivalent. The full scale noise amplitude is adapted in a manner that will make it equal to an amplitude that corresponds to the instantaneous analog level represented by the weight of the least significant bit position of the conversion.

Present pseudo-random noise methods of compression limit the obtainable compression ratio (referenced to straight PCM) to positive integers and restrict system operation to one fixed value of compression that must be set prior to its use in a communication link. This invention provides a technique for obtaining compression ratios that can be positive mixed numbers as well as positive integers. The invention also provides a means for manually or automatically selecting a compression to control the efficiency of a television communications system to satisfy a variety of real-time operational conditions.

The invention embodies the use of an adaptive variable resolution, or variable word length, encoding technique as a means for providing an adaptive compression pseudo-random noise processor for use in communication systems. This processor can be used for reducing the channel capacity required for transmitting picture or television signals between two physically separated stations. A processor is required at the receiving station as well as at the transmitting station. These units differ slightly and for convenience they will be referred to as a pretransmission processor (PTP) and a post-reception processor (PRP). The basic function of the PTP is to add an adapted pseudo-random noise to picture data and encode this combined signal by a variable resolution encoder to generate a pulse coded picture plus noise signal. This signal is then used to modulate a transmitter to satisfy the communication system transmission requirements. The basic function of the PRP is to remove, after reception, the adapted pseudo-random noise from the combined picture plus noise data after decoding of the combined signal. Decoding is accomplished by a variable resolution decoder.

Figure 1A:
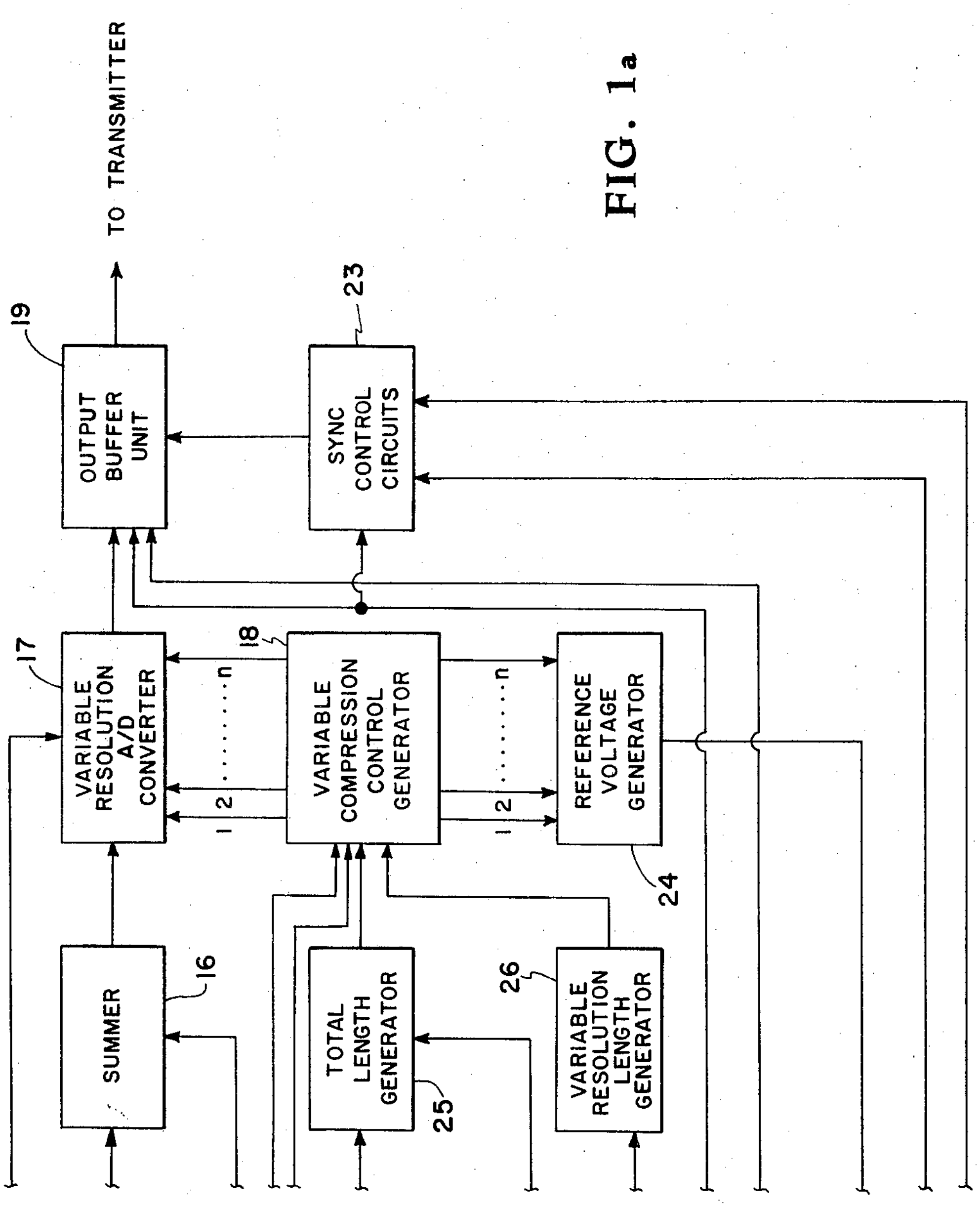
Figure 2:
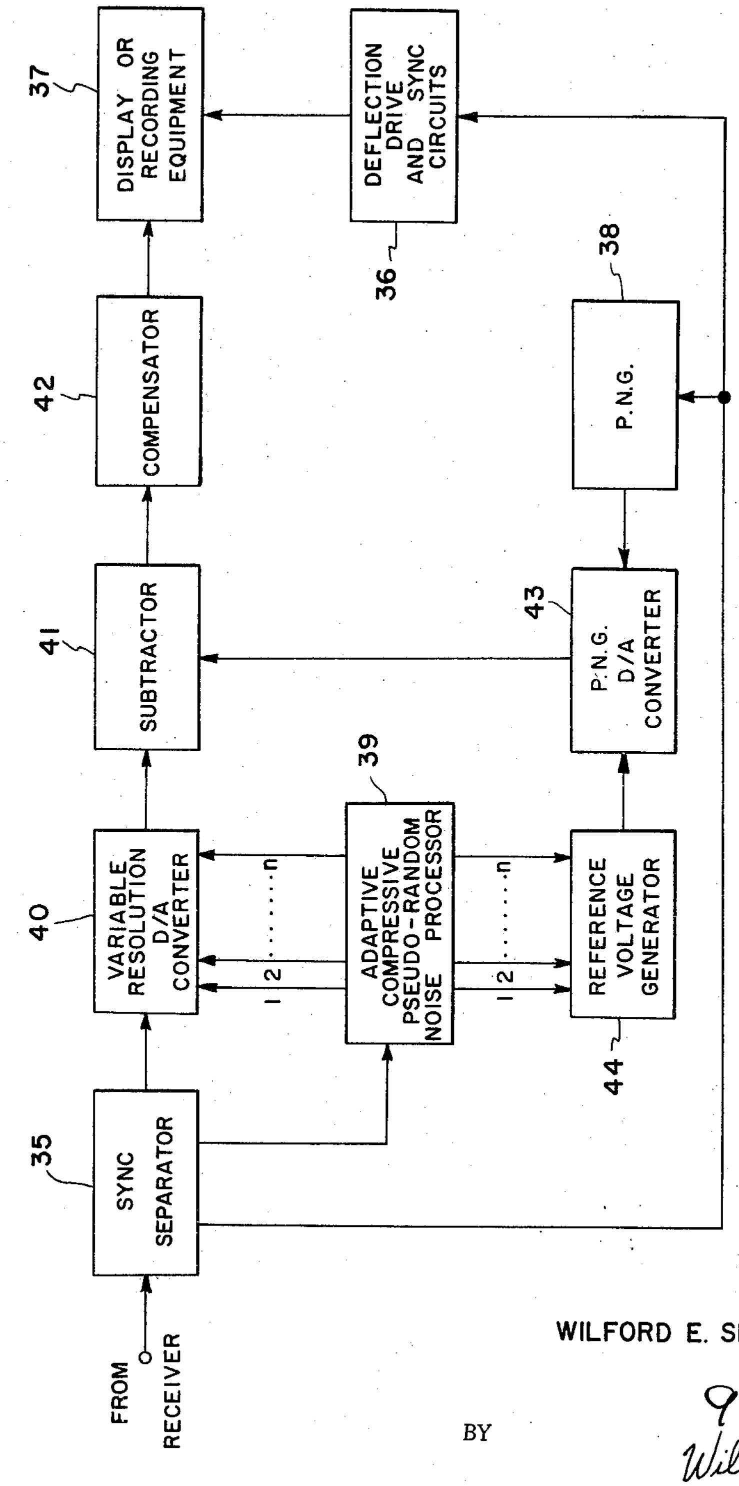

The objects and advantages of this invention will further become apparent hereinafter and in the drawings, in which:

FIGS. 1 and 1*a* are a block diagram of a transmitting system utilizing this invention;

FIG. 2 is a block diagram of a receiving system utilizing this invention; and

Figure 3:
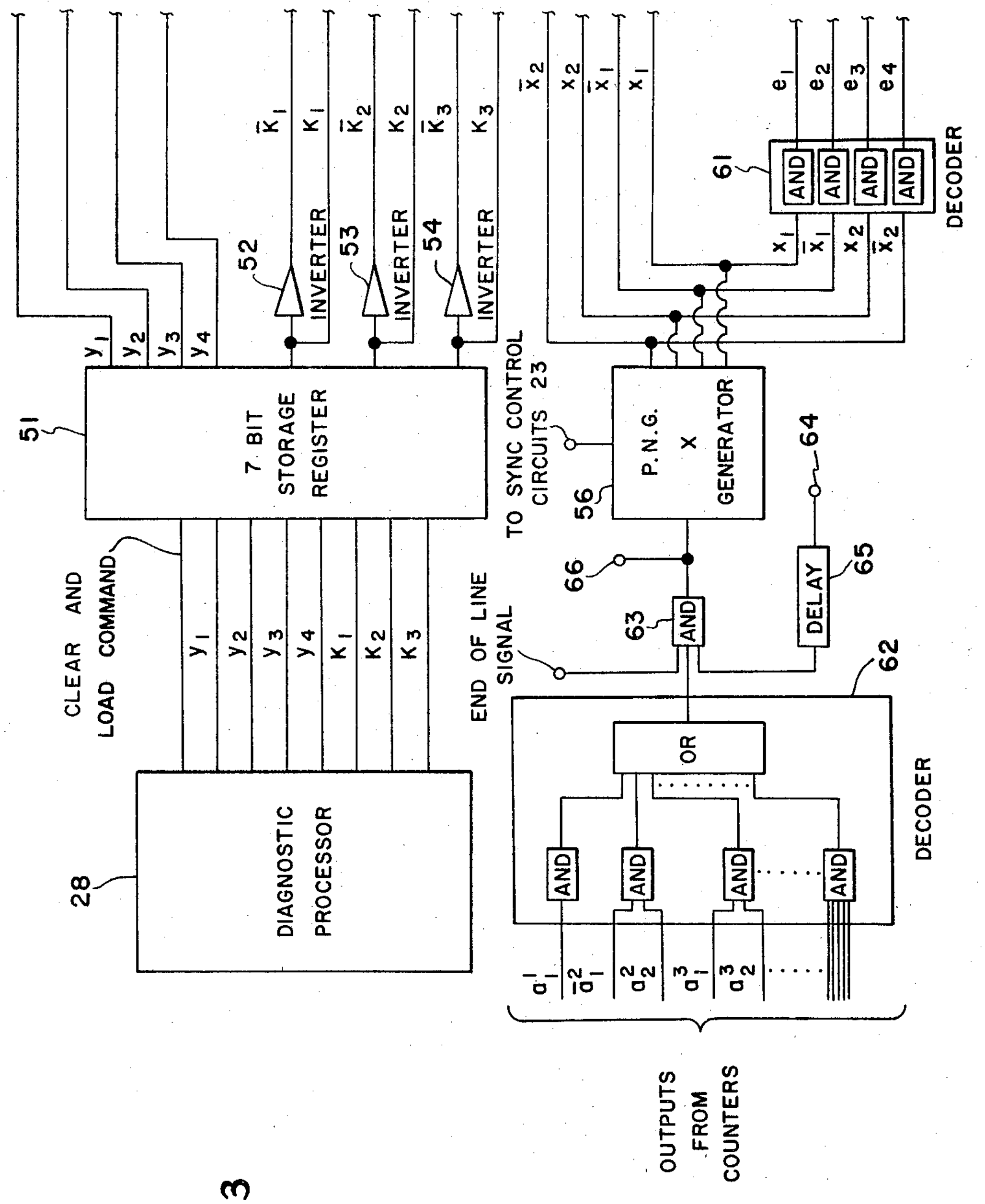
Figure 3A:
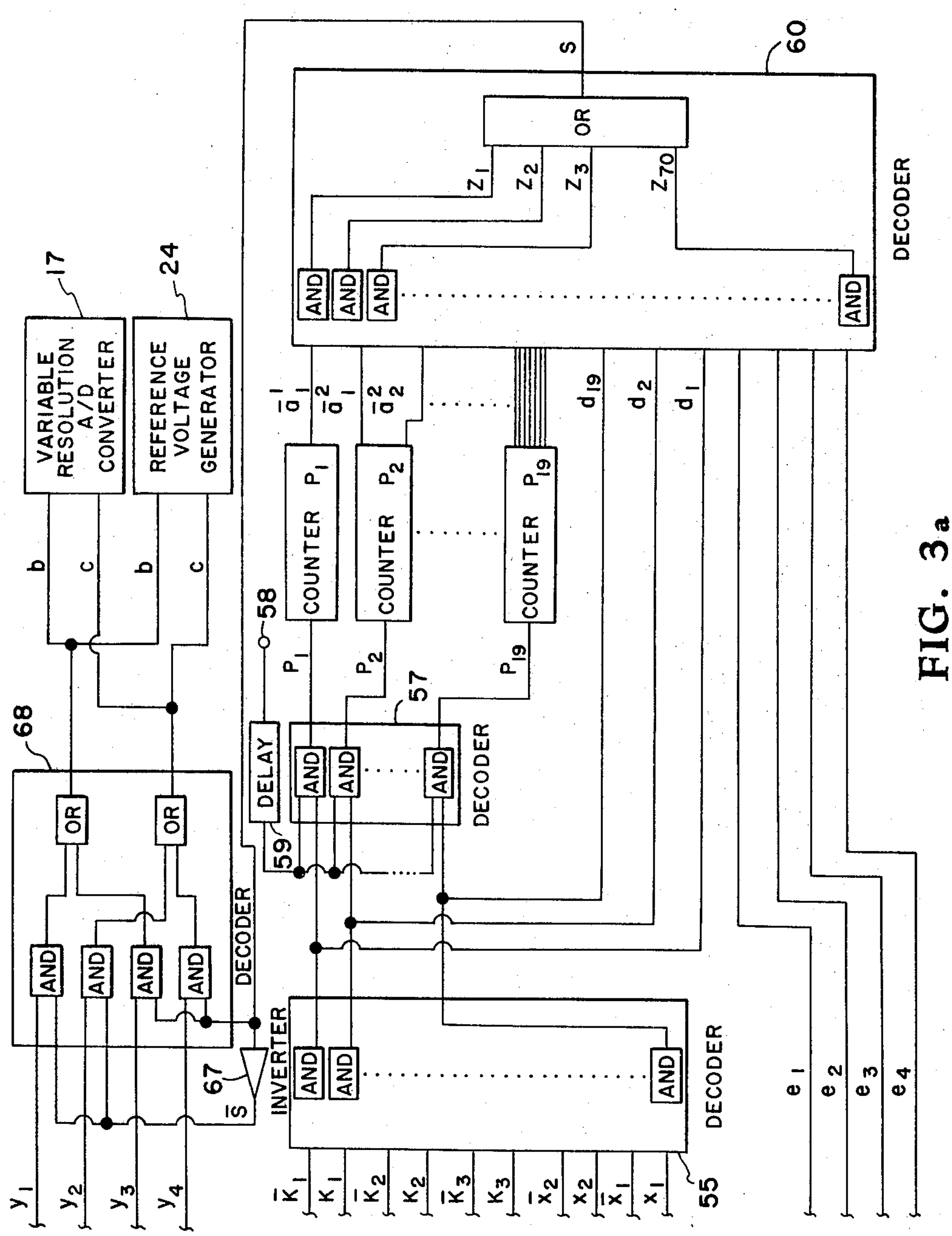

FIGS. 3 and 3*a* are a block diagram of an adaptive compression pseudo-random noise processor that constitutes this invention.

In describing the embodiment of the invention illustrated in the drawings, specific terminology will be resorted to for the sake of clarity; however, it is not intended to be limited to the specific terms so selected, and it is to be understood that each specific term includes all technical equivalents which operate in a similar manner to accomplish a similar purpose.

Turning now to the embodiment of the invention selected for illustration, the number 11 in FIG. 1 designates a picture or other data source which is scanned at a constant rate. This is accomplished by an optic system in conjunction with a flying spot scanner, vidicon, orthicon, or etc., making up what is referred to as an image signal generator 12. Generator 12 is controlled by deflection drive and sync circuits 13 and a clock 14. The resulting output signal from generator 12 is a continuous video amplitude time history. The voltage amplitude varies with picture spatial brightness as a function of scan position and rate. This video signal is applied to the input of a compensator 15 whose transfer function is such as to optimize the signal to satisfy eye response characteristics. One compensator characteristic approaching optimum results is as follows: let X equal input signal to compensator and Y equal output signal from compensator. The compensator characteristics is to be such that: Y is equal to X raised to the ½ power. After compensation the signal has one level of pseudo-random noise added to it by a summer 16. One level of pseudo-random noise will be defined later in terms of encoder resolution. The composite analog signal (compensated video plus pseudo-random noise) is encoded by a variable resolution analog-to-digital converter 17 into a digital equivalent. Variable resolution analog-to-digital converter 17 is capable of converting the voltage from summer 16 into a one through *n* bit word as selected by a variable compression control generator 18. After analog-to-digital conversion, the digital composite signal is placed in a buffer or temporary storage unit 19. The output from buffer 19 is used to modulate a transmitter for satisfying the communication system requirements.

A pseudo-random noise generator (PNG), 20, a PNG sync generator 21 and a PNG digital-to-analog converter 22 are required to produce a pseudo-random noise signal which is applied to summer 16 to add to the video signal. These units function together to generate a pseudo-random noise signal having a predictable cycle at the proper amplitude. The pseudo-random noise is generated in PNG 20 as a digital signal by a shift register equipped with proper feedback and shifted at element rate. A register of $m$ bits is capable of generating a $2^m-1$ code word cycle. PNG 20 is a conventional digital pseudo-random noise generator and will therefore not be disclosed in detail in this specification. PNG sync generator 21 is a digital register generating a pulse every time it receives $2^a$ pulses from clock 14, where $a$ is a preselected constant determined from frame rate. $a$ is selected so that generator 21 generates one pulse at least once per frame. This pulse returns all register bit positions of the PNG 20 to a desired common state, say logical "1"; and is also applied to sync control circuits 23 to provide synchronization of information.

The PNG digital-to-analog converter 22 decodes a number of PNG 20 register positions into an analog level required to add one level (full scale) of analog pseudo-random noise to the compensated video signal. One level of pseudo-random noise is determined by the selected resolution of the variable resolution analog-to-digital converter 17. This level is controlled by variable compression control generator 18 which provides a digital input of one through $n$ lines to a reference voltage generator 24. Generator 24, which can be a digital-to-analog converter, establishes a full scale reference voltage that is utilized by the PNG digital-to-analog converter 22. The amplitude of this voltage corresponds to the magnitude represented by the least significant bit position of the variable resolution analog-to-digital converter 17. In other words, the level of the voltage produced by generator 24 corresponds to the selected resolution of converter 17. The output from generator 24 provides the PNG digital-to-analog converter 22 with the proper full scale voltage to allow it to generate one level of pseudorandom noise.

The variable compression control generator 18 requires four inputs in addition to its outputs that have been discussed. One input is from a total length generator 25, one is from a variable resolution length generator 26, one is from a compression input information generator 27, and one is from clock 14. The variable compression control generator 18 utilizes these inputs to select a digital output that is applied to both the variable resolution analog-to-digital converter 17 and the reference voltage generator 24. The total length generator 25, the variable resolution generator 26, the compression input information set generator 27, and the variable compression control generator 18 operate together to satisfy the following normalized compression channel capacity equation:

$$C_{AP_N}=R_1\left(1-\frac{x}{n}\right)+\frac{x}{n}R_2 \qquad (1)$$

Where $n$ is the total length of a sequence, $x$ is the total number of elements in a sequence that are encoded at $R_2$ bits; $(n-x)$ is the total number of elements in a sequence that are encoded at $R_1$ bits; $C_{AP_N}$ is a normalized channel capacity required to render the system capable of satisfying a given picture source entropy; $R_1$ is encoder word length selection 1; and $R_2$ is encoder word length selection 2.

Generator 25 supplies the $n$ data to generator 18, generator 26 supplies the $x$ data to generator 18, and generator 27 supplies the $R_1$ and $R_2$ data to generator 18. Generator 27 also contains logic circuitry for supplying the $n$ and $x$ set data to generators 25 and 26. Generator 18 utilizes the $n$ and $x$ data to switch between $R_1$ and $R_2$ at the proper times.

The input to set generator 27 can be supplied from different sources. One source can be from a diagnostic processor 28, another source can be from manual or preset input control data that is applied to terminal 29, and a further source can be remote control data which is also applied to terminal 29. The input to set generator 27 is also applied to buffer 19 to be transmitted to the receiving station. Clock 14 produces four sources of pulses. One at bit rate, one at the element rate, one at the line rate and one at the frame rate. All of these sources of pulses are applied to the deflection drive and sync circuits 13 and to the sync circuits 23. The pulses at the element rate are applied to the PNG sync generator 21, the PNG 20, the total length generator 25, the compression input information set generator 27 and the analog-to-digital converter 30.

After reception and detection of the data transmitted from buffer 19, it is separated by a sync separator 35 in FIG. 2 into sync, timing and composite signal data. The sync and timing data is then routed to deflection drive and sync circuits 36 for controlling picture display or recording equipment 37, a PNG 38, and a variable adaptive compression pseudo-random noise processor 39. The composite signal is applied to the input of a variable resolution digital-to-analog converter 40 where it is decoded into an analog signal. At this point, the signal is an analog voltage composed of compensated picture data plus pseudo-random noise. This signal along with a pseudo-random noise signal identical to the noise added in the PTP are applied to the input of a subtractor 41. Subtractor 41 satisfies the requirement of removing one level of pseudo-random noise from the decoded composite signal. The output from subtractor 41 is an analog picture signal representative of the compensated picture data generated in the PTP prior to the addition of the pseudo-random noise. The output from subtractor 41 is applied to the input of a compensator 42 which produces an output representative of the picture data generated by image signal generator 12 in FIG. 1. Compensator 42 has a characteristic such that $X^1$ is equal to $Y^1$ squared where $Y^1$ is equal to input signal and $X^1$ is equal to output signal. The output of compensator 42 is applied to display or recording equipment 37 where it is displayed or recorded for future reconstruction and display.

PNG 38, PNG digital-to-analog converter 43 and reference voltage generator 44 are identical to PNG 20, PNG digital-to-analog converter 22 and reference voltage generator 24 in FIG. 1. This means that a noise signal identical to the one applied to summer 16 in FIG. 1 is applied to the subtractor 41 in FIG. 2. The adaptive compression pseudo-random noise processor 39 performs the same function as the generators 18, 25, 26 and 27 in FIG. 1. Variable resolution digital-to-analog converter 40 perform the inverse function performed by converter 17 in FIG. 1.

Referring now to FIGS. 3 and 3*a*, one possible embodiment of the variable compression control generator 18, the total length generator 25, the variable resolution length generator 26, the compression input formation set generator 27, and the diagnostic processor 28 in FIG. 1 will be described. Diagnostic processor 28 is a general purpose computer which does three things. It computes the information content of each picture to be transmitted; it sets this computed information content equal to $C_{AP_N}$ in Equation 1 above and computes the values for $R_1$, $R_2$ and K where K is equal to $n$ divided by $x$; and it compares successive values of these computed $R_1$, $R_2$ and K values and when there is a change, it applies a clear and load signal to a seven bit storage register 51. This clear and load signal clears the register and loads in the new values for $R_1$, $R_2$ and K. As was disclosed earlier, these $R_1$, $R_2$ and K values can be supplied by the means other than the diagnostic processor 28. However, for purposes of description, we will assume that these values are supplied from the diagnostic processor 28.

The information content H of the picture that is to be transmitted is computed by the following equation.

$$H=-\sum_{i=1}^{M} p_i \log_2 p_i \quad (2)$$

Where $P_i$ is the probability of the occurrence of the *i*th event and M is the number of different events possible.

As an example, assume that M is equal to 4, $p_1$ is equal to .25, $p_2$ is equal to .5, $p_3$ is equal to .125 and $p_4$ is equal to .125. Then $$H=-(.25 \log_2 .25+.5 \log_2 .5+.125 \log .125+.125 \log .125)=1.75 \text{ bits/element}$$

It can be seen from this example that a statistical measurement of source data can be used to compute the information content of the source.

To compute the probability of occurrence of each event or grey tone, the diagnostic processor 28 contains a counter for each event and also a counter to count the total number of source elements for one complete frame of information being transmitted. For example, suppose that 16 different events or grey tones are being transmitted, then there will be 16 counters needed to count the number of occurrences of each of these events and a counter for counting the total number of elements in one complete frame of information. Thus, the ratio of the count on each event counter to the count on the total element counter is the probability of occurrence for that particular event. When H is computed, it is set equal to $C_{AP_N}$ in Equation 1. Then iterative solutions of the resulting equation are made to establish proper values for $R_1$, $R_2$, and K, where K is equal to *n* divided by *x*. For this illustration $R_1$ and $R_2$ will be allowed to take on integer values from 1 to 4; K will be allowed to take an integer value from 2 to 8; and *x* will be allowed to take on integer values from 1 to 4. Hence, the value of $R_1$ is represented by a two bit binary code, the value of $R_2$ is represented by a two bit binary code and the value of K is represented by a three bit binary code. Diagnostic processor 28, for this illustration, will produce the values for $R_1$, $R_2$ and K on seven lines which are applied to the storage register 51. These lines are $y_1$ and $y_2$ which represent $R_1$; $y_3$ and $y_4$ which represent $R_2$ and $K_1$, $K_2$ and $K_3$ which represent K. The computed values for $R_1$, $R_2$ and K appear on lines $y_1$, $y_2$, $y_3$, $y_4$, $K_1$, $K_2$ and $K_3$ as shown on the following Maps 1, 2 and 3.

MAP 1

| Value of $R_1$ | A/D word length | Code | |
|---|---|---|---|
| | | Line $y_1$ | Line $y_2$ |
| 1 | 1 Bit | 0 | 0 |
| 2 | 2 Bits | 0 | 1 |
| 3 | 3 Bits | 1 | 0 |
| 4 | 4 Bits | 1 | 1 |

MAP 2

| Value of $R_2$ | A/D word length | Code | |
|---|---|---|---|
| | | Line $y_3$ | Line $y_4$ |
| 1 | 1 Bit | 0 | 0 |
| 2 | 2 Bits | 0 | 1 |
| 3 | 3 Bits | 1 | 0 |
| 4 | 4 Bits | 1 | 1 |

MAP 3

| Value of K | K Code | | |
|---|---|---|---|
| | $K_1$ | $K_2$ | $K_3$ |
| 2 | 0 | 0 | 1 |
| 3 | 0 | 1 | 0 |
| 4 | 0 | 1 | 1 |
| 5 | 1 | 0 | 0 |
| 6 | 1 | 0 | 1 |
| 7 | 1 | 1 | 0 |
| 8 | 1 | 1 | 1 |

The *A/D* word length appearing in Maps 1 and 2 is the resolution of *A/D* converter 17. For this illustration, it is assumed that *A/D* converter 17 has a maximum resolution of 4 bits. Diagonistic processor 28, in addition to producing values for $R_1$, $R_2$ and K, compares values of $R_1$, $R_2$ and K for successive pictures, and where there is a change in their values, it produces a clear and load command signal which is applied to register 51. In response to this signal register 51 unloads the old values of $R_1$, $R_2$ and K, and loads the new values.

The $K_1$, $K_2$ and $K_3$ outputs from storage register 51 are inverted by inverters 52, 53, and 54, respectively. These inverted values $\overline{K}_1$, $\overline{K}_2$ and $\overline{K}_3$ along with the values $K_1$, $K_2$ and $K_3$ are applied to a decoder 55. A PNG *x* generator 56 produces a digital noise value on lines $x_1$, $\overline{x}_1$ $x_2$ and $\overline{x}_2$ that is changed each time a $p_i$ counter completes one cycle coincident with an end of line signal. The *x* generator data is then inserted into a line synchronization pattern in a conventional PCM manner, and transmitted as sync data. This is employed to synchronize the receiver system to keep the *x* generator in both transmitter and receiver systems in step. The *x* lines from generator 56 are decoded in a decoder 61 to generate $e_i$ values as shown in Map 4.

MAP 4

| Value of x | $x_1$ | $x_2$ | Value of |
|---|---|---|---|
| 1 | 0 | 0 | e |
| 2 | 0 | 1 | e |
| 3 | 1 | 0 | e |
| 4 | 1 | 1 | e |

Generator 56 digital noise signals $x_1$, $x_2$, $\overline{x}_1$ and $\overline{x}_2$ are also applied to decoder 55. Digital pseudo-random noise generators which will produce these four noise signals are well known and therefore will not be disclosed in this specification. Decoder 55 is nothing more than 19 "and" gates with the inputs to the decoder 55 applied to these "and" gates in accordance with the following Map 5.

MAP 5

| $x_1$ | $x_2$ | $K_1$ | $K_2$ | $K_3$ | Select $P_i$ | Cycles length | $d_i$ |
|---|---|---|---|---|---|---|---|
| 0 | 0 | 0 | 0 | 1 | $P_1$ | 2 | $d_1$ |
| 0 | 0 | 0 | 1 | 0 | $P_2$ | 3 | $d_2$ |
| 0 | 0 | 0 | 1 | 1 | $P_3$ | 4 | $d_3$ |
| 0 | 0 | 1 | 0 | 0 | $P_4$ | 5 | $d_4$ |
| 0 | 0 | 1 | 0 | 1 | $P_5$ | 6 | $d_5$ |
| 0 | 0 | 1 | 1 | 0 | $P_6$ | 7 | $d_6$ |
| 0 | 0 | 1 | 1 | 1 | $P_7$ | 8 | $d_7$ |
| 0 | 1 | 0 | 0 | 1 | $P_3$ | 4 | $d_3$ |
| 0 | 1 | 0 | 1 | 0 | $P_5$ | 6 | $d_5$ |
| 0 | 1 | 0 | 1 | 1 | $P_7$ | 8 | $d_7$ |
| 0 | 1 | 1 | 0 | 0 | $P_9$ | 10 | $d_9$ |
| 0 | 1 | 1 | 0 | 1 | $P_{10}$ | 12 | $d_{10}$ |
| 0 | 1 | 1 | 1 | 0 | $P_{11}$ | 14 | $d_{11}$ |
| 0 | 1 | 1 | 1 | 1 | $P_{13}$ | 16 | $d_{13}$ |
| 1 | 0 | 0 | 0 | 1 | $P_5$ | 6 | $d_5$ |
| 1 | 0 | 0 | 1 | 0 | $P_8$ | 9 | $d_8$ |
| 1 | 0 | 0 | 1 | 1 | $P_{10}$ | 12 | $d_{10}$ |
| 1 | 0 | 1 | 0 | 0 | $P_{12}$ | 15 | $d_{12}$ |
| 1 | 0 | 1 | 0 | 1 | $P_{14}$ | 18 | $d_{14}$ |
| 1 | 0 | 1 | 1 | 0 | $P_{16}$ | 21 | $d_{16}$ |
| 1 | 0 | 1 | 1 | 1 | $P_{17}$ | 24 | $d_{17}$ |
| 1 | 1 | 0 | 0 | 1 | $P_7$ | 8 | $d_7$ |
| 1 | 1 | 0 | 1 | 0 | $P_{10}$ | 12 | $d_{10}$ |
| 1 | 1 | 0 | 1 | 1 | $P_{13}$ | 16 | $d_{13}$ |
| 1 | 1 | 1 | 0 | 0 | $P_{15}$ | 20 | $d_{15}$ |
| 1 | 1 | 1 | 0 | 1 | $P_{17}$ | 24 | $d_{17}$ |
| 1 | 1 | 1 | 1 | 0 | $P_{18}$ | 28 | $d_{18}$ |
| 1 | 1 | 1 | 1 | 1 | $P_{19}$ | 32 | $d_{19}$ |

The $d_i$ values are the outputs from the "and" gates in decoder 55, the $P_i$ values are the selected counters from a group of counters $P_1$ through $P_{19}$, and the cycle length values are the lengths of the counting cycles of the counters. As an example as to how the inputs to decoder 55 are connected to the inputs of the different "and" gates, consider the second "and" gate in decoder 55. It has the lines $\overline{X}_1$, $\overline{X}_2$, $\overline{K}_1$, $K_2$ and $\overline{K}_3$ connected to it. If each of these lines has a logical "1" on it, the "and" gate produces a logical "1" which appears on line $d_2$ and which selects counter $P_2$ in a manner described below.

The output from each of the 19 "and" gates in the decoder 55 are applied to a decoder 57. Decoder 57 is identical to decoder 55 in that it contains 19 "and" gates. Hence, the output from each of the "and" gates in decoder 55 is applied to the input of the corresponding "and" gate in decoder 57. The element rate of clock 14 in FIG. 1 is applied to terminal 58 which is applied through a one-unit delay 59 to each of the 19 "and" gates in decoder 57. The output from each of the "and" gates in decoder 57 is applied to the corresponding one of the set of $P_1$ through $P_{19}$ counters. Certain ones of the outputs of the $P_1$ through $P_{19}$ counters along with the lines $d_1$ through $d_{19}$ are applied to a decoder 60 as will be described later. Only one of the "and" gates in decoder 57 will have a logical "1" applied to it, hence, only one of the $P_1$ through $P_{19}$ counters will count the pulse applied to terminal 58 at any given time.

The cycle length $n$ of each of the $P_1$ through $P_{19}$ counters is shown on Map. 5. Each counter has $m$ stages where $m$ is greater than or equal to the logarithm to the base of two of $n$. If $m$ is greater than the logarithm to the base 2 of $n$, logical feedback is required to cycle the counter to satisfy the length $n$. This type of counter is a straight forward design in which examples can be found in many textbooks on logical circuits. Each of the $m$ stages of each counter produces an output which will be called $a$ and the inverse of that output will be called $\bar{a}$. The superscript of each $a$ and $\bar{a}$ denotes the counter number and the subscript of each $a$ and $\bar{a}$ denotes the stage of that particular counter. Each stage of a counter is a flip-flop, hence, the $a$ is taken from one side of the flip-flop, and the $\bar{a}$ is taken from the other side of the flip-flop for that particular stage.

The outputs $x_1$, $x_2$, $\bar{x}_1$ and $\bar{x}_2$ from PNG $x$ generator 56, in addition to being applied to decoder 55, are applied to the input of a decoder 61. Decoder 61 consists of 4 "and" gates with $x_1$, $x_2$, $\bar{x}_1$ and $\bar{x}_2$ applied to these "and" gates in accordance with Map 4 to produce the outputs $e_1$, $e_2$, $e_3$ and $e_4$. The outputs $e_1$, $e_2$, $e_3$ and $e_4$ from decoder 61 are applied to decoder 60. Decoder 60 consists of 70 "and" gates with the output from each of the "and" gates being applied to an "or" gate. The output from the "or" gate is the output of decoder 60 and is denoted by "S." The inputs to decoder 60 are applied to the different "and" gates in the decoder in accordance with the following Map 6.

MAP 6

$Z_1=e_1\bar{a}_1^{1}d_1$ $Z_2=e_1\bar{a}_1^{2}\bar{a}_2^{2}d_2$ $Z_3=e_1\bar{a}_1^{3}\bar{a}_2^{3}d_3$ $Z_4=e_1\bar{a}_1^{4}\bar{a}_2^{4}\bar{a}_3^{4}d_4$ $Z_5=e_1\bar{a}_1^{5}\bar{a}_2^{5}\bar{a}_3^{5}d_5$ $Z_6=e_1\bar{a}_1^{6}\bar{a}_2^{6}\bar{a}_3^{6}d_6$ $Z_7=e_1\bar{a}_1^{7}\bar{a}_2^{7}\bar{a}_3^{7}d_7$ $Z_8=e_2\bar{a}_1^{3}\bar{a}_2^{3}d_3$ $Z_9=e_2a_1^{3}\bar{a}_2^{3}d_3$ $Z_{10}=e_2\bar{a}_1^{5}\bar{a}_2^{5}\bar{a}_3^{5}d_5$ $Z_{11}=e_2a_1^{5}\bar{a}_2^{5}\bar{a}_3^{5}d_5$ $Z_{12}=e_2\bar{a}_1^{7}\bar{a}_2^{7}\bar{a}_3^{7}d_7$ $Z_{13}=e_2a_1^{7}\bar{a}_2^{7}\bar{a}_3^{7}d_7$ $Z_{14}=e_2\bar{a}_1^{9}\bar{a}_2^{9}\bar{a}_3^{9}\bar{a}_4^{9}d_9$ $Z_{15}=e_2a_1^{9}\bar{a}_2^{9}\bar{a}_3^{9}\bar{a}_4^{9}d_9$ $Z_{16}=e_2\bar{a}_1^{10}\bar{a}_2^{10}\bar{a}_3^{10}\bar{a}_4^{10}d_{10}$ $Z_{17}=e_2a_1^{10}\bar{a}_2^{10}\bar{a}_3^{10}\bar{a}_4^{10}d_{10}$ $Z_{18}=e_2\bar{a}_1^{11}\bar{a}_2^{11}\bar{a}_3^{11}\bar{a}_4^{11}d_{11}$ $Z_{19}=e_2a_1^{11}\bar{a}_2^{11}\bar{a}_3^{11}\bar{a}_4^{11}d_{11}$ $Z_{20}=e_2\bar{a}_1^{13}\bar{a}_2^{13}\bar{a}_3^{13}\bar{a}_4^{13}d_{13}$ $Z_{21}=e_2a_1^{13}\bar{a}_2^{13}\bar{a}_3^{13}\bar{a}_4^{13}d_{13}$ $Z_{22}=e_3\bar{a}_1^{5}\bar{a}_2^{5}\bar{a}_3^{5}d_5$ $Z_{23}=e_3a_1^{5}\bar{a}_2^{5}\bar{a}_3^{5}d_5$ $Z_{24}=e_3\bar{a}_1^{5}a_2^{5}\bar{a}_3^{5}d_5$ $Z_{25}=e_3\bar{a}_1^{8}\bar{a}_2^{8}\bar{a}_3^{8}\bar{a}_4^{8}d_8$ $Z_{26}=e_3a_1^{8}\bar{a}_2^{8}\bar{a}_3^{8}\bar{a}_4^{8}d_8$ $Z_{27}=e_3\bar{a}_1^{8}a_2^{8}\bar{a}_3^{8}\bar{a}_4^{8}d_8$ $Z_{28}=e_3\bar{a}_1^{10}\bar{a}_2^{10}\bar{a}_3^{10}\bar{a}_4^{10}d_{10}$ $Z_{29}=e_3a_1^{10}\bar{a}_2^{10}\bar{a}_3^{10}\bar{a}_4^{10}d_{10}$ $Z_{30}=e_3\bar{a}_1^{10}a_2^{10}\bar{a}_3^{10}\bar{a}_4^{10}d_{10}$ $Z_{31}=e_3\bar{a}_1^{12}\bar{a}_2^{12}\bar{a}_3^{12}\bar{a}_4^{12}d_{12}$ $Z_{32}=e_3a_1^{12}\bar{a}_2^{12}\bar{a}_3^{12}\bar{a}_4^{12}d_{12}$ $Z_{33}=e_3\bar{a}_1^{12}a_2^{12}\bar{a}_3^{12}\bar{a}_4^{12}d_{12}$ $Z_{34}=e_3\bar{a}_1^{14}\bar{a}_2^{14}\bar{a}_3^{14}\bar{a}_4^{14}\bar{a}_5^{14}d_{14}$ $Z_{35}=e_3a_1^{14}\bar{a}_2^{14}\bar{a}_3^{14}\bar{a}_4^{14}\bar{a}_5^{14}d_{14}$ $Z_{36}=e_3\bar{a}_1^{14}a_2^{14}\bar{a}_3^{14}\bar{a}_4^{14}\bar{a}_5^{14}d_{14}$ $Z_{37}=e_3\bar{a}_1^{16}\bar{a}_2^{16}\bar{a}_3^{16}\bar{a}_4^{16}\bar{a}_5^{16}d_{16}$ $Z_{38}=e_3a_1^{16}\bar{a}_2^{16}\bar{a}_3^{16}\bar{a}_4^{16}\bar{a}_5^{16}d_{16}$ $Z_{39}=e_3\bar{a}_1^{16}a_2^{16}\bar{a}_3^{16}\bar{a}_4^{16}\bar{a}_5^{16}d_{16}$ $Z_{40}=e_3\bar{a}_1^{17}\bar{a}_2^{17}\bar{a}_3^{17}\bar{a}_4^{17}\bar{a}_5^{17}d_{17}$ $Z_{41}=e_3a_1^{17}\bar{a}_2^{17}\bar{a}_3^{17}\bar{a}_4^{17}\bar{a}_5^{17}d_{17}$ $Z_{42}=e_3\bar{a}_1^{17}a_2^{17}\bar{a}_3^{17}\bar{a}_4^{17}\bar{a}_5^{17}d_{17}$ $Z_{43}=e_4\bar{a}_1^{7}\bar{a}_2^{7}\bar{a}_3^{7}d_7$ $Z_{44}=e_4a_1^{7}\bar{a}_2^{7}\bar{a}_3^{7}d_7$ $Z_{45}=e_4\bar{a}_1^{7}a_2^{7}\bar{a}_3^{7}d_7$ $Z_{46}=e_4a_1^{7}a_2^{7}\bar{a}_3^{7}d_7$ $Z_{47}=e_4\bar{a}_1^{10}\bar{a}_2^{10}\bar{a}_3^{10}\bar{a}_4^{10}d_{10}$ $Z_{48}=e_4a_1^{10}\bar{a}_2^{10}\bar{a}_3^{10}\bar{a}_4^{10}d_{10}$ $Z_{49}=e_4\bar{a}_1^{10}a_2^{10}\bar{a}_3^{10}\bar{a}_4^{10}d_{10}$ $Z_{50}=e_4a_1^{10}a_2^{10}\bar{a}_3^{10}\bar{a}_4^{10}d_{10}$ $Z_{51}=e_4\bar{a}_1^{13}\bar{a}_2^{13}\bar{a}_3^{13}\bar{a}_4^{13}d_{13}$ $Z_{52}=e_4a_1^{13}\bar{a}_2^{13}\bar{a}_3^{13}\bar{a}_4^{13}d_{13}$ $Z_{53}=e_4\bar{a}_1^{13}a_2^{13}\bar{a}_3^{13}\bar{a}_4^{13}d_{13}$ $Z_{54}=e_4a_1^{13}a_2^{13}\bar{a}_3^{13}\bar{a}_4^{13}d_{13}$ $Z_{55}=e_4\bar{a}_1^{15}\bar{a}_2^{15}\bar{a}_3^{15}\bar{a}_4^{15}\bar{a}_5^{15}d_{15}$ $Z_{56}=e_4a_1^{15}\bar{a}_2^{15}\bar{a}_3^{15}\bar{a}_4^{15}\bar{a}_5^{15}d_{15}$ $Z_{57}=e_4\bar{a}_1^{15}a_2^{15}\bar{a}_3^{15}\bar{a}_4^{15}\bar{a}_5^{15}d_{15}$ $Z_{58}=e_4a_1^{15}a_2^{15}\bar{a}_3^{15}\bar{a}_4^{15}\bar{a}_5^{15}d_{15}$ $Z_{59}=e_4\bar{a}_1^{17}\bar{a}_2^{17}\bar{a}_3^{17}\bar{a}_4^{17}\bar{a}_5^{17}d_{17}$ $Z_{60}=e_4a_1^{17}\bar{a}_2^{17}\bar{a}_3^{17}\bar{a}_4^{17}\bar{a}_5^{17}d_{17}$ $Z_{61}=e_4\bar{a}_1^{17}a_2^{17}\bar{a}_3^{17}\bar{a}_4^{17}\bar{a}_5^{17}d_{17}$ $Z_{62}=e_4a_1^{17}a_2^{17}\bar{a}_3^{17}\bar{a}_4^{17}\bar{a}_5^{17}d_{17}$ $Z_{63}=e_4\bar{a}_1^{18}\bar{a}_2^{18}\bar{a}_3^{18}\bar{a}_4^{18}\bar{a}_5^{18}d_{18}$ $Z_{64}=e_4a_1^{18}\bar{a}_2^{18}\bar{a}_3^{18}\bar{a}_4^{18}\bar{a}_5^{18}d_{18}$ $Z_{65}=e_4\bar{a}_1^{18}a_2^{18}\bar{a}_3^{18}\bar{a}_4^{18}\bar{a}_5^{18}d_{18}$ $Z_{66}=e_4a_1^{18}a_2^{18}\bar{a}_3^{18}\bar{a}_4^{18}\bar{a}_5^{18}d_{18}$ $Z_{67}=e_4\bar{a}_1^{19}\bar{a}_2^{19}\bar{a}_3^{19}\bar{a}_4^{19}\bar{a}_5^{19}d_{19}$ $Z_{68}=e_4a_1^{19}\bar{a}_2^{19}\bar{a}_3^{19}\bar{a}_4^{19}\bar{a}_5^{19}d_{19}$ $Z_{69}=e_4\bar{a}_1^{19}a_2^{19}\bar{a}_3^{19}\bar{a}_4^{19}\bar{a}_5^{19}d_{19}$ $Z_{70}=e_4a_1^{19}a_2^{19}\bar{a}_3^{19}\bar{a}_4^{19}\bar{a}_5^{19}d_{19}$ The outputs from counters $P_1$ through $P_{19}$, in addition to being applied to decoder 60, are applied to a decoder 62. Decoder 62 consists of 19 "and" gates with the outputs from the "and" gates applied to an "or" gate. The outputs from the counters $P_1$ through $P_{19}$ are applied to the inputs of the "and" gates in decoder 62 in accordance with the following Map 7.

MAP 7

$D_1=a_1^{1}$ $D_2=\bar{a}_1^{2}a_2^{2}$ $D_3=a_1^{3}a_2^{3}$ $D_4=\bar{a}_1^{4}\bar{a}_2^{4}a_3^{4}$ $D_5=a_1^{5}\bar{a}_2^{5}a_3^{5}$ $D_6=\bar{a}_1^{6}a_2^{6}a_3^{6}$ $D_7=a_1^{7}a_2^{7}a_3^{7}$ $D_8=\bar{a}_1^{8}\bar{a}_2^{8}\bar{a}_3^{8}a_4^{8}$ $D_9=a_1^{9}\bar{a}_2^{9}\bar{a}_3^{9}a_4^{9}$ $D_{10}=a_1^{10}a_2^{10}\bar{a}_3^{10}a_4^{10}$ $D_{11}=a_1^{11}\bar{a}_2^{11}a_3^{11}a_4^{11}$ $D_{12}=\bar{a}_1^{12}a_2^{12}a_3^{12}a_4^{12}$ $D_{13}=a_1^{13}a_2^{13}a_3^{13}a_4^{13}$ $D_{14}=a_1^{14}\bar{a}_2^{14}\bar{a}_3^{14}\bar{a}_4^{14}a_5^{14}$ $D_{15}=a_1^{15}a_2^{15}\bar{a}_3^{15}\bar{a}_4^{15}a_5^{15}$ $D_{16}=\bar{a}_1^{16}\bar{a}_2^{16}a_3^{16}\bar{a}_4^{16}\bar{a}_5^{16}$ $D_{17}=a_1^{17}a_2^{17}a_3^{17}\bar{a}_4^{17}a_5^{17}$ $D_{18}=a_1^{18}a_2^{18}\bar{a}_3^{18}a_4^{18}a_5^{18}$ $D_{19}=a_1^{19}a_2^{19}a_3^{19}a_4^{19}a_5^{19}$ Where the D's represent the corresponding "and" gates in decoder 62. The output of decoder 62 is applied through an "and" gate 63 to PNG $x$ generator 56. Element pulses are applied from clock 14 to terminals 64 which are delayed two units by a delay 65 and then applied to "and" gate 63. This "and" gate has one additional input line which is energized when the scanner completes one scan (or generates an end of the line signal). Thus when the selected one of the counters $P_1$ through $P_{19}$ counts through its complete cycle, and it is coincident with an end of the line scan, voltage levels are applied to "and" gate 63. This will allow an element pulse from terminal 64 to be gated through this "and" gate two units of time later. This produces a one state shift in PNG $x$ generator 56 to generate a new value for $x$. The output from "and" gate 63 is also applied through a terminal 66 to all of the counters $P_1$ through $P_{19}$ to reset them to their initial or starting positions.

The output S from decoder 60 is a logical "1" $x$ clock times out of every $n$ clock times and is a logical "0" ($n$-$x$) clock times out of every $n$ clock times. In this way, the selected $n$ cycle is partitioned into two parts; $n$ and ($n$-$x$). S is used to steer $R_1$ and $R_2$ code words on lines $y_1$, $y_2$, $y_3$ and $y_4$ from the seven bits storage register 51 to variable resolution AD converter 17 and reference voltage generator 24. S is inverted by an inverter 67 to produce $\bar{S}$. Then S, $\bar{S}$, $y_1$, $y_2$, $y_3$ and $y_4$ are all applied to a decoder 68. Decoder 68 consists of 4 "and" gates and two "or" gates which are connected as shown by the following Map 8.

MAP 8

| S | $y_1$ | $y_2$ | $y_3$ | $y_4$ | Line $b$ | Line $c$ | Word type | A/D word | RGV level |
|---|---|---|---|---|---|---|---|---|---|
| 0 | 0 | 0 | (*) | (*) | 0 | 0 | $R_1$ | 1 bit---- | Full scale. |
| 0 | 0 | 1 | (*) | (*) | 0 | 1 | $R_1$ | 2 bits--- | ½ f.s. |
| 0 | 1 | 0 | (*) | (*) | 1 | 0 | $R_1$ | 3 bits--- | ¼ f.s. |
| 0 | 1 | 1 | (*) | (*) | 1 | 1 | $R_1$ | 4 bits--- | ⅛ f.s. |
| 1 | (*) | (*) | 0 | 0 | 0 | 0 | $R_2$ | 1 bit---- | Full scale. |
| 1 | (*) | (*) | 0 | 1 | 0 | 1 | $R_2$ | 2 bits---- | ½ f.s. |
| 1 | (*) | (*) | 1 | 0 | 1 | 0 | $R_2$ | 3 bits---- | ¼ f.s. |
| 1 | (*) | (*) | 1 | 1 | 1 | 1 | $R_2$ | 4 bits---- | ⅛ f.s. |

*Don't care state.

The function of the decoder 68 is to connect $R_1$, which is represented by the lines $y_1$ and $y_2$, to the output lines *b* and *c*, $(n-x)$ clock pulses out of *n* clock pulses; and to connect $R_2$, which is represented by lines $y_3$ and $y_4$ to the lines *b* and *c*, *x* clock times out of *n* clock pulses.

The digital information on lines *b* and *c* control the variable resolution AD converter 17 and reference voltage generator 24 in accordance with the Map 8. It is obvious that the required most significant bits from the variable resolution AD converter can be selected in accordance with the above mapping with "and" gates. The reference voltage generator 24 which is a digital-to-analog converter makes the conversion as shown in Map 8. That is, generator 24 is a digital-to-analog converter which is capable of producing four levels of analog voltage: full scale, ½ full scale, ¼ full scale, and ⅛ full scale. These different voltage levels are selected by the code word on lines *b* and *c*.

The operation of the adaptive compression pseudo-random noise processor in FIGS. 3 and 3*a* will now be described by assuming a specific data output from diagnostic processor 28. Assume that processor 28 produces the following outputs: $R_1$ equal to 1, $R_2$ equal to 4 and K equal to 4. Assume that generator 56 produces an *x* output equal to 1. Then lines $y_3$, $y_4$, $K_2$, $K_3$, $\bar{x}_1$ and $\bar{x}_2$ have a logical "1" on them and lines $y_1$, $y_2$, $K_1$, $x_1$ and $x_2$ have a logical "0" on them. From Map 5, it can be seen that only counter $P_3$ is selected and a logical "1" appears on line $d_3$. Each of the other *d* lines has a logical "0" on it. From Map 4, it can be seen that line $e_1$ has a logical "1" on it and each of the other *e* lines has a logical "0" on it. Hence, from Map 6 $Z_3$ is the only "and" gate in decoder 60 which will produce a logical "1" output and it only does this one time during the complete cycle of counter $P_3$. Since counter $P_3$ has a cycle length of 4, S is a logical "1" one time during the cycle and a logical "0" during the other three times in the cycle. If generator 56 produces an *x* equal to 4, then counter $P_{13}$ is selected. Thus, from Map 6, logical "1" is on each of the lines $Z_{51}$, $Z_{52}$, $Z_{53}$ and $Z_{54}$ one time during the 16 length cycle of counter $P_{13}$. If generator 56 produces an *x* equal to 2, then counter $P_7$ is selected. Hence, a logical "1" is on each of the lines $Z_{12}$ and $Z_{13}$ one time during the 8 length cycle of counter $P_7$. If generator 56 produces an *x* equal to 3, then counter $P_{10}$ is selected. Thus a logical "1" is on each of the lines $Z_{28}$, $Z_{29}$ and $Z_{30}$ one time during the 12 length cycle of counter $P_{10}$. Therefore, for any value of *x*, $R_1$ is applied to converter 17 and generator 24 $(n-x)$ times during the cycle and $R_2$ is applied to converter 17 and generator 24 *x* times during the cycle.

As can be readily seen from the above example the ratio of the times that $R_1$ is applied to converter 17 and generator 24 to the times that $R_2$ is applied to converter 17 and generator 24 remains the same for any value of K and is not influenced by the value of *x*. All that *x* does is to select the counter and hence the length of the cycle.

It is to be understood that the form of the invention herein shown and described is to be taken as only one possible embodiment of the invention. Various changes may be made in the shapes, size and arrangement of parts. For example, equivalent elements may be substituted for those illustrated and described herein, parts may be reversed, and certain features of the invention may be utilized independently of the use of other features, all without departing from the spirit or scope of the invention as defined in the following claims.

What is claimed is:

1. In a pulse code modulated communication system of the type in which pseudo-random noise is added to the transmitted signal prior to transmission to achieve bandwidth compression, an adaptive compression pseudo-random noise processor comprising: means receiving said transmitted signal and responsive to any change in the quality of said transmitted signal for changing the resolution of the transmitted signal; and means controlled by said last mentioned means for changing the level of pseudo-random noise added to said transmitted signal to correspond to the new resolution of the transmitted signal whereby more efficient transmission of pulse code modulated signals are obtained.

2. In a pulse code modulated communication system that has a certain maximum resolution for transmitting data: means receiving said data and responsive to the quality of said data for producing first signals indicative of a first and a second distinct resolution of said system whereby at least one of said distinct resolutions is less than said certain maximum resolution; means for producing second signals indicative of an arbitrary period; and means responsive to the quality of said data said first signals and said second signals for making the resolution of said system equal to said first distinct resolution during a part of said arbitrary period and for making the resolution of said system equal to said second distinct resolution during the remainder of said period whereby bandwidth compression is achieved.

3. In a pulse code modulated communication system according to claim 2 wherein additional means receiving said data, said first signals and said second signals are provided for adding a first level of pseudo-random noise to said transmitted data prior to encoding when it is encoded at said first distinct resolution and for adding a second level of pseudo-random noise to said transmitted data prior to encoding when it is encoded at said second distinct resolution.

4. In a pulse code modulated communication system of the type in which pseudo-random noise is added to the transmitted signal prior to transmission to achieve bandwidth compression, an adaptive compression pseudo-random noise processor comprising: means for sampling the data being transmitted; means responsive to said sampled data for generating digital signals corresponding to the quality of said sampled data; means responsive to said digital signals for adding different levels of pseudo-random noise corresponding to the digital signals, to the transmitted data prior to encoding; and means responsive to said digital signals and the combined signal of data and pseudo-random noise for encoding the combined signal of data and pseudo-random noise in accordance with the digital signals whereby more efficient transmission of pulse code modulated data signals are obtained by further reducing the required bandwidth.

5. In a pulse code modulated communication system of the type in which pseudo-random noise is added to the transmitted signal prior to transmission to achieve bandwidth compression, an adaptive compression pseudo-random noise processor comprising: means for sampling the data being transmitted; means responsive to said sampled data for generating $R_1$, $R_2$ and *n* digital signals corresponding to the quality of said sampled data where $R_1$ and $R_2$ are different parallel digital signals and $n$ is and $n$-bit serial digital signal with its first $x$ bits being one binary value and its other $(n-x)$ bits being the other binary value; decoder means responsive to said $R_1$, $R_2$ and $n$ digital signals for producing at its output the digital signal $R_1$, $x$ times and for producing at its output the digital signal $R_2$, $(n-x)$ times; means responsive to the $R_1$ and $R_2$ signals at the output of said decoder means for adding levels of pseudo-random noise corresponding to $R_1$ and $R_2$ to the transmitted data prior to encoding; and means responsive to the $R_1$ and $R_2$ signals at the output of said decoder means for encoding the combined signal of data and pseudo-random noise at resolutions corresponding to $R_1$ and $R_2$ whereby more efficient transmission of pulse code modulated data signals are obtained by further reducing the required bandwidth.

6. In a pulse code modulated communication system of the type in which pseudo-random noise is added to the transmitted signal prior to transmission to achieve bandwidth compression, an adaptive compression pseudo-random noise process comprising: means for sampling the data being transmitted; means responsive to said sampled data for generating values for $R_1$, $R_2$ and K in accordance with the normalized compression channel capacity equation $$C_{AP_N} = R_1\left(1-\frac{x}{n}\right) + \frac{h}{n} R_2$$

where $K=n/x$; means for generating arbitrary values for selecting a counter that has a counting cycle equal to $n$; means responsive to said K and $x$ values and the outputs from the stages of said selected counter for generating a logical "1" signal $x$ times during said cycle and for generating a logical "0" signal $(n-x)$ times during said cycle; decoder means responsive to said $R_1$ and $R_2$ values and to said logical "1" and logical "0" signals for producing at the output of said decoder means the value of $R_2$, $x$ times during the $n$ cycle and the value $R_1$, $(n-x)$ times during the $n$ cycle; means responsive to the $R_1$ and $R_2$ signals at the output of said decoder means for adding levels of pseudo-random noise, corresponding to $R_1$ and $R_2$, to the transmitted data prior to encoding; and means responsive to the $R_1$ and $R_2$ signals at the output of said decoder means for encoding the combined signal of data and pseudo-random noise at resolutions corresponding to $R_1$ and $R_2$ whereby more efficient transmission of pulse code modulated data signals are obtained by further reducing the required bandwidth.

7. An adaptive compression pseudo-random noise processor according to claim 6 wherein said means for generating arbitrary values for $x$ is a digital pseudo-random noise generator.

8. An adaptive compression pseudo-random noise processor according to claim 6 wherein said means for adding levels of pseudo-random noise, corresponding to $R_1$ and $R_2$, to the transmitted data prior to encoding includes a digital pseudo-random noise generator; a digital-to analog converter for converting said digital pseudo-random noise from said digital pseudo-random noise generator to an analog signal; means receiving said analog signal for changing the amplitude of said analog signal to levels corresponding to $R_1$ and $R_2$; and means for adding said analog signal levels to said transmitted data.

9. An adaptive compression pseudo-random noise processor according to claim 6 wherein said means for encoding the combined signal of data and pseudo-random noise is a variable resolution analog-to-digital converter.

References Cited

UNITED STATES PATENTS 3,244,808 4/1966 Roberts.

ROBERT L. GRIFFIN, Primary Examiner

A. J. MAYER, Assistant Examiner

U.S. Cl. X.R.

178—6BWR; 325—38